United States Patent [19]

Akiba

[11] Patent Number: 4,972,179

[45] Date of Patent: Nov. 20, 1990

[54] LIQUID LEAKAGE DETECTION APPARATUS INCLUDING WHEATSTONE BRIDGE

[75] Inventor: Juji Akiba, Saitama, Japan

[73] Assignee: Junkosha Co., Ltd., Tokyo, Japan

[21] Appl. No.: 385,187

[22] Filed: Jul. 26, 1989

[30] Foreign Application Priority Data

Aug. 18, 1988 [JP] Japan .............................. 63-107926

[51] Int. Cl.⁵ ............................................. G08B 21/00
[52] U.S. Cl. .................................. 340/605; 200/61.05; 174/11 R; 174/115; 324/693
[58] Field of Search .............. 340/604, 605; 324/65 P, 324/542, 539, 543, 544, 691, 693, 694, 696; 174/11 R, 115; 200/61.04, 61.05, 61.06

[56] References Cited

U.S. PATENT DOCUMENTS

| | | | |
|---|---|---|---|
| 3,105,214 | 9/1963 | Blythe et al. | 324/696 |
| 4,206,632 | 6/1980 | Suzuki et al. | 340/605 |
| 4,663,614 | 5/1987 | Rauchwerger | 340/605 |

FOREIGN PATENT DOCUMENTS

| | | | |
|---|---|---|---|
| 0277642 | 11/1965 | Australia | 174/115 |
| 0697960 | 11/1964 | Canada | 174/115 |
| 1913125 | 9/1970 | Fed. Rep. of Germany | 340/604 |
| 2911703 | 10/1980 | Fed. Rep. of Germany | 304/604 |
| 3016131 | 10/1981 | Fed. Rep. of Germany | 174/11 R |
| 0182340 | 7/1922 | United Kingdom | 174/11 R |
| 2186722 | 8/1987 | United Kingdom | 340/605 |

Primary Examiner—Joseph A. Orsino
Assistant Examiner—Jill Jackson
Attorney, Agent, or Firm—Mortenson & Uebler

[57] ABSTRACT

Liquid leakage detection apparatus is provided comprising: (a) a long detecting component wherein there are the following components bundled together: (i) a first conductor having a leading end and a trailing end, the first conductor covered by insulation, (ii) a second bare conductor having a leading end and a trailing end, the second conductor positioned parallel to the first conductor, the trailing end of the second conductor being connected with the trailing end of the first conductor, and (iii) a third conductor covered by a porous insulation and positioned parallel to the second conductor, (b) the leading end of the first conductor and the leading end of the second conductor being connected by the detecting means which detects and indicates a potential difference between the first and second conductors; (c) the leading ends of the first and second conductors also being connected, respectively, to one of the electrodes of a power supply, each through respective, known resistances; and (d) the third conductor being connected to the other electrode of the power supply such that a Wheatstone Bridge circuit is formed when the second conductor and third conductor are short circuited by a leaking liquid.

1 Claim, 1 Drawing Sheet

LIQUID LEAKAGE DETECTION APPARATUS INCLUDING WHEATSTONE BRIDGE

BACKGROUND OF THE INVENTION

The present invention relates to liquid leakage detecting apparatus which can monitor areas subject to leakage, and which can perform this monitoring function over a broad area.

Liquid leakage detecting devices are used in a variety of locations. Such devices are used to detect water leakage from water pipes in multi-unit dwellings, and to detect the leakage of chemicals from storage tanks and pipelines in chemical plants.

Various leakage detection principles are used in such sensors. One especially well-known operating principle is as follows: i.e., a detecting component is formed from a pair of electrodes which constitute a portion of a detection circuit. An electrical change which occurs in the detection circuit when the electrodes of the detecting component are short-circuited, and thus electrically connected, by the liquid constituting the target of detection is detected, and leakage is detected as a result of the detection of this electrical change.

Conventional liquid leakage detecting devices are able to function satisfactorily as long as it is necessary to monitor the possible occurrence of leakage in a restricted area.

However, in cases where it is desired not only to monitor a broad area for the possible occurrence of leakage, but also to ascertain exactly where leakage is occurring within this broad area when leakage does occur, e.g., in cases where a pipeline is monitored for leakage, it is necessary to divide the pipeline into small segments, and to install a detecting component in each segment, with these detecting components being centrally controlled. Such a system is disadvantageous in that they are expensive, a considerable amount of labor is expended in installing the detecting parts, and a complicated monitoring system is required. Furthermore, the use of such a system results in an increase in equipment operating costs.

The present invention was designed in light of the problems encountered in conventional systems. The object of the present invention is to provide a liquid leakage detection apparatus which makes it possible to ascertain in detail any locations where leakage may occur, without complicating the detecting component structure.

SUMMARY OF THE INVENTION

Liquid leakage detection apparatus is provided comprising: (a) a long detecting component wherein there are the following components bundled together: (i) a first conductor having a leading end and a trailing end, the first conductor covered by insulation, (ii) a second bare conductor having a leading end and a trailing end, the second conductor positioned parallel to the first conductor, the trailing end of the second conductor being connected with the trailing end of the first conductor, and (iii) a third conductor covered by a porous insulation and positioned parallel to the second conductor, (b) the leading end of the first conductor and the leading end of the second conductor being connected by detecting means which detects and indicates a potential difference between he first and second conductors; (c) the leading ends of the first and second conductors also being connected, respectively, to one of the electrodes of a power supply, each through respective, known resistances; and (d) the third conductor being connected to the other electrode of the power supply such that a Wheatstone Bridge circuit is formed when the second conductor and third conductor are short circuited by a leaking liquid.

Figure 1:
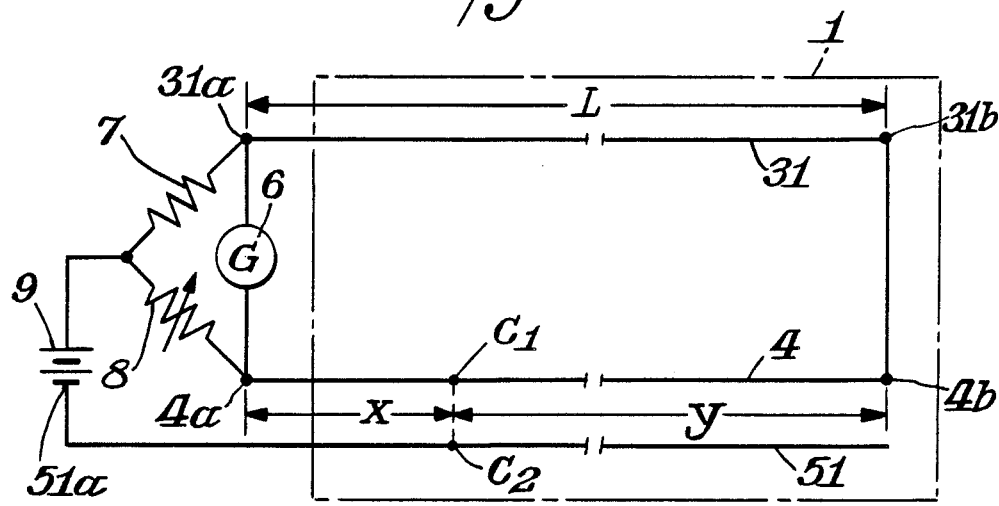
FIG. 1 is a schematic diagram of leak detecting apparatus according to the invention.

DETAILED DESCRIPTION OF THE INVENTION AND PREFERRED EMBODIMENTS WITH REFERENCE TO THE DRAWINGS

Liquid leakage detection apparatus is provided comprising: (a) a long detecting component wherein there are the following components bundled together: (i) a first conductor having a leading end and a trailing end, the first conductor covered by insulation, (ii) a second bare conductor having a leading end and a trailing end, the second conductor positioned parallel to the first conductor, the trailing end of the second conductor being connected with the trailing end of the first conductor, and (iii) a third conductor covered by a porous insulation and positioned parallel to the second conductor, (b) the leading end of the first conductor and the leading end of the second conductor being connected by detecting means which detects and indicates a potential difference between the first and second conductors; (c) the leading ends of the first and second conductors also being connected, respectively, to one of the electrodes of a power supply, each through respective, known resistances; and (d) the third conductor being connected to the other electrode of the power supply such that a Wheatstone Bridge circuit is formed when the second conductor and third conductor are short circuited by a leaking liquid.

Specifically, the present invention is a liquid leakage detection apparatus which is characterized by the fact that (a) a long detecting component is formed by bundling together (i) a first conductor which is covered by an insulator, (ii) a second bare conductor which is positioned parallel to the first conductor, and whose trailing end is connected with the trailing end of the first conductor, and (iii) a third conductor which is positioned parallel to the second conductor in a non-contact state, being insulated with a porous, braided insulation, (b) the leading end of the first conductor and the leading end of the second conductor in the detecting component are connected with each other through detecting means which detects any potential difference, (c) the leading ends of the first conductor and the second conductor also being connected to one of the electrodes of a power supply through respective known resistances, and (d) the third conductor is connected to the other electrode of the power supply so that a Wheatstone Bridge circuit is formed when the second conductor and third conductor are short-circuited by a leaking liquid.

The long detecting component is installed in the area that is to be monitored for leakage in the same manner that electrical wiring in installed.

Under ordinary condition, i.e., when there is no liquid leakage, the second conductor and third conductor are electrically insulated from each other. Under such conditions, therefore, no Wheatstone Bridge circuit is formed by the first, second and third conductors. Accordingly, no potential difference is generated between the respective leading ends of the first conductor and the second conductor.

When leakage occurs, the second conductor and third conductor are short-circuited, and thus electrically connected, by the leaking liquid, which is electrically conductive as in the case of water. Accordingly, a Wheatstone Bridge circuit is formed by the first, second and third conductors, the detecting means, the known resistance and the power supply. As a result, a potential difference, which can be correlated to the location of the liquid leakage, is generated between the respective leading ends of the first conductor and second conductor, and this potential difference is detected by the detecting means.

Figure 2:
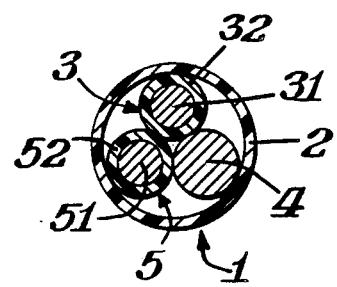
FIG. 2 is a perspective cross-sectional view of the long detecting component used in the invention.

One example of application of the present invention will be described below with reference to attached FIGS. 1 and 2. FIG. 1 is a basic circuit diagram of the liquid leakage detection apparatus of the present invention, and FIG. 2 is a cross-section of the detecting component.

The detecting component of this liquid detection apparatus will be described first.

As shown by the cross-section in FIG. 2, the detecting component 1 is constructed as follows: two insulated wires 3, 5 and one bare conductor 4 are bundled together by means of a porous braid 2 consisting of an insulating material such as a polyester braid, so that a structure resembling a single long covered wire is formed.

One of the covered wires, i.e., 3, is a silver-plated conductor 31, the first conductor, and an insulator 32 which is preferably a polytetrafluoroethylene-hexafluoropropylene copolymer, and which covers the conductor 31. The other insulated wire 5 is a silver-plated conductor 51, the third conductor, and preferably a polyester braid 52 which covers the conductor 51. The conductor 4 is a stainless steel wire, the second conductor.

The respective conductors 4, 31, 51 in the detecting component 1 form part of a detection circuit. As shown in FIG. 1, the trailing end 31b of the conductor 31 and the trailing end 4b of the conductor 4 are electrically connected with each other at the tip of the detecting component 1. The trailing end of the conductor 51 is electrically insulated from the trailing ends 4b and 31b.

In other words, the structure of the detecting component 1 may also be described as follows: the conductors 4, 31, 51 positioned parallel to each other inside the braid 2; the conductor 31 and conductor 4 are electrically insulated from each other by the insulator 32, except for the connection at the respective leading ends 31a 4a of the conductors and the connection at the respective trailing ends 31b 4b of the conductors. The conductor 4 and the conductor 51 are maintained in a non-contacting state by the porous braid 52.

The leading end 31a of the conductor 31 and the leading end 4a of the conductor 4 are electrically connected with each other through a galvanometer, which is a detecting means 6. The leading end 31a of the conductor 31 is connected with one terminal of a battery, the power supply 9, through a fixed resistor 7, with a resistance value of $R_1$, and the leading end 4a of the conductor 4 is connected with the same terminal through a variable resistor 8. The leading end 51a of the conductor 51 is connected with the other terminal of the battery 9.

The action of the liquid leakage detection apparatus will now be described using as an example a case where the apparatus is used to monitor liquid leakage from a pipeline in a chemical plant.

The detecting component 1 is installed along the length of the pipeline, using the same installation procedures used in the case of electrical wire installation, so that the detecting component 1 is adjacent the bottom of the pipeline.

When there is no leakage from the pipeline, the conductor 4 and conductor 51 are insulated from each other within the detecting component 1. Accordingly, under such conditions, no Wheatstone Bridge circuit is formed, and thus no potential difference is generated between the leading end 31a of the conductor 31 and the leading end 4a of the conductor 4. As a result, the galvanometer 6 shows no indication.

When liquid leakage occurs at an intermediate point on the pipeline, the leaking liquid penetrates through the braid 2 of the detecting component 1, and also penetrates through the braid 52 of the covered wire 5, so that the conductor 4 and conductor 51 are short-circuited and, thus, electrically connected with each other. As a result, a Wheatstone Bridge circuit is formed by the power supply 9, fixed resistor 7, conductor 31, conductor 4, variable resistor 8, galvanometer 6 and conductor 51. Accordingly, a potential difference correlating to the location of the short-circuit, i.e., the location of the leakage, is generated between the leading end 31a of the conductor 31 and the leading end 4a of the conductor 4, and the galvanometer 6 reacts to this potential difference.

As shown in FIG. 1, L represents the length of the conductor 31 and conductor 4. Let $r_1$ represent the resistance per unit length of the conductor 31, and $r_2$ represent the resistance per unit length of the conductor 4. As is indicated by the broken line in FIG. 1, a short-circuit is considered to have taken place between point $C_1$ on the conductor 4 and point $C_2$ on the conductor 51. In this case, let x represent the distance between the leading end 4a of the conductor 4 and the short-circuit point $C_1$, and y represent the distance between the short-circuit point $C_1$ and the trailing end 4b of the conductor 4.

Assuming that $R_2$ is the resistance value of the variable resistor 8 when the variable resistor 8 is adjusted so that no electric current flows through the galvanometer 6, i.e., so that no potential difference is generated between the leading end 31a of the conductor 31 and the leading end 4a of the conductor 4, then $$R_1 r_2 x = R_2(Lr_1 + r_2 y)$$

Here, since L=x+y, $$x = R_2 L(r_1 + r_2)/r_2(R_1 + R_2)$$

Accordingly, the location where the leakage has occurred can be ascertained precisely. Thus, a liquid leakage monitoring procedure can be adopted which allows a finer resolution than is possible using conventional devices.

The present invention is not limited to the example described. Various other configurations may be used. For example, the braid 2 used in the above example is not absolutely necessary. It would be possible to twist the covered wires 3, 5 and conductor 4 together to form a twisted-wire-form bundle.

The first conductor 31 and third conductor 51 are not limited to silver-plated conductors, nor is the second conductor 4 limited to a stainless steel wire. It would also be possible to modify the design using other appropriate materials for these conductors.

As described above, the present invention has superior merits. Specifically, a long detecting component is formed by bundling a first, second and third conductor together under prescribed conditions, so that a Wheatstone Bridge circuit is formed when the second and third conductors are short-circuited by a leaking liquid. Accordingly, the exact location of the leakage can be determined over a broad area such as along the length of a pipeline.

In view of the structure of the detecting component, the installation of this component can be accomplished very simply in a manner similar to the installation of an electrical wire.

While the invention has been disclosed herein in connection with certain embodiments and detailed descriptions, it will be clear to one skilled in the art that modifications or variations of such details can be made without deviating from the gist of this invention, and such modifications or variations are considered to be within the scope of the claims hereinbelow.

What is claimed is:

1. Liquid leakage detection apparatus comprising:
   (a) a long detecting component wherein there are the following components bundled together;
      (i) a first conductor having a leading end and a trailing end, said first conductor covered by insulation,
      (ii) a second bare conductor having a leading end and a trailing end, said second conductor positioned parallel to said first conductor, the trailing end of said second conductor being connected with the trailing end of said first conductor, and
      (iii) a third conductor covered by a porous insulation and positioned parallel to said second conductor,
   (b) the leading end of said first conductor and the leading end of said second conductor being connected by detecting means which detects and indicates a potential difference between said first and second conductors;
   (c) the leading ends of said first and second conductors also being connected to one of the terminals of a power supply, each through known resistances; and
   (d) said third conductor being connected to the other terminal of said power supply such that a Wheatstone Bridge circuit is formed when said second conductor and third conductor are short circuited by a leaking liquid.

* * * * *